United States Patent [19]

McMills

[11] Patent Number: 4,938,820

[45] Date of Patent: Jul. 3, 1990

[54] JOINING OF SHEETS

[75] Inventor: Corey J. McMills, Los Altos, Calif.

[73] Assignee: Raychem Corporation, Menlo Park, Calif.

[21] Appl. No.: 394,288

[22] Filed: Aug. 15, 1989

Related U.S. Application Data

[63] Continuation of Ser. No. 61,354, Jun. 11, 1987, abandoned.

[51] Int. Cl.$^5$ .................... B29C 53/36; B29C 65/34
[52] U.S. Cl. ................................ 156/83; 156/218; 156/273.9; 156/293; 156/304.3; 156/304.6; 156/380.1; 219/541; 219/544; 428/61
[58] Field of Search ................ 156/78, 83, 218, 272.4, 156/273.9, 274.2, 293, 380.1, 379.7, 304.2, 304.3, 304.6; 219/541, 544; 428/57, 58, 61

[56] References Cited

U.S. PATENT DOCUMENTS

| | | | |
|---|---|---|---|
| 2,282,832 | 5/1942 | Spooner | 201/76 |
| 2,388,297 | 11/1945 | Slaughter | 156/304.3 |
| 2,739,829 | 8/1950 | Pedlow et al. | 285/115 |
| 2,930,634 | 3/1960 | Merritt | 285/21 |
| 2,992,457 | 7/1961 | Harrison | 18/59 |
| 3,049,465 | 8/1962 | Wilkins | 156/272 |
| 3,340,328 | 9/1967 | Brindell et al. | 260/897 |
| 3,359,524 | 12/1967 | Gallacher et al. | 338/212 |
| 3,406,055 | 5/1968 | Rubel | 156/275 |
| 3,506,519 | 4/1970 | Blumenkranz | 156/275 |
| 3,528,867 | 9/1970 | Leatherman et al. | 156/272 |
| 3,542,402 | 11/1970 | Caples et al. | 285/21 |
| 3,706,176 | 12/1972 | Leatherman | 53/42 |
| 3,891,490 | 6/1975 | Humphries | 156/304.3 |
| 3,927,233 | 12/1975 | Naidoff | 156/304.6 |
| 3,987,276 | 10/1976 | Vogelsanger et al. | 219/535 |
| 3,991,243 | 11/1976 | Biddell | 156/304.6 |
| 4,025,600 | 5/1977 | Parr | 156/218 |
| 4,051,454 | 9/1977 | Leiser et al. | 338/328 |
| 4,055,615 | 10/1977 | Ikeda | 264/105 |
| 4,067,765 | 1/1978 | Heller, Jr. et al. | 156/272.4 |
| 4,085,286 | 4/1978 | Horsma et al. | 174/92 |
| 4,090,899 | 5/1978 | Reich | 156/79 |
| 4,110,145 | 8/1978 | Lombardi | 156/273.9 |
| 4,151,126 | 4/1979 | Adelman et al. | 252/508 |
| 4,151,364 | 4/1979 | Ellis | 174/84 |
| 4,177,376 | 12/1979 | Horsma et al. | 219/553 |
| 4,177,446 | 12/1979 | Diaz | 338/212 |
| 4,330,703 | 5/1982 | Horsma et al. | 219/553 |
| 4,330,704 | 5/1982 | Jensen | 219/553 |
| 4,378,323 | 3/1983 | Brandeau | 156/273.9 |
| 4,421,582 | 12/1983 | Horsma et al. | 156/86 |
| 4,455,482 | 6/1984 | Grandclement | 219/551 |
| 4,502,929 | 3/1985 | Stewart et al. | 204/147 |
| 4,518,552 | 5/1985 | Matsuo et al. | 264/126 |
| 4,548,662 | 10/1985 | Chazan et al. | 156/86 |
| 4,570,055 | 2/1985 | McMills | 219/541 |
| 4,575,617 | 3/1986 | Cooper | 219/494 |
| 4,624,487 | 11/1986 | Thalmann | 285/197 |
| 4,659,912 | 4/1987 | Derbyshire | 219/535 |
| 4,670,078 | 6/1987 | Thalmann et al. | 156/274.2 |
| 4,675,512 | 6/1987 | Doucet et al. | 219/535 |
| 4,695,335 | 9/1987 | Lyall | 156/64 |
| 4,729,809 | 3/1988 | Dery et al. | 156/306.6 |
| 4,731,199 | 3/1988 | Matsuo et al. | 252/511 |

FOREIGN PATENT DOCUMENTS

| | | |
|---|---|---|
| 036963 | 10/1981 | European Pat. Off. . |
| 123540 | 10/1984 | European Pat. Off. . |
| 157640 | 10/1985 | European Pat. Off. . |
| 171450 | 2/1986 | European Pat. Off. . |
| 0117762 | 12/1986 | European Pat. Off. . |
| 1885743 | 11/1963 | Fed. Rep. of Germany . |
| 1374690 | 8/1964 | France . |
| 2111818 | 6/1972 | France . |
| 51-84866 | 7/1976 | Japan . |
| 53-147732 | 12/1978 | Japan . |
| 56-161115 | 12/1981 | Japan . |
| 58-164627 | 3/1983 | Japan . |
| 1213126 | 9/1986 | Japan . |
| 62-48747 | 9/1987 | Japan . |
| 62-288029 | 12/1987 | Japan . |
| 95845 | 4/1960 | Norway . |
| 839743 | 6/1960 | United Kingdom . |
| 1010197 | 11/1965 | United Kingdom . |
| 1155470 | 6/1969 | United Kingdom . |
| 2065430A | 6/1981 | United Kingdom . |
| 1605005 | 12/1981 | United Kingdom . |

OTHER PUBLICATIONS

Coughlan et al., "Ultrahigh Molecular Weight Polyethylene", Encylopedia Polymer Science and Engineering, 2d, vol. 6, pp. 490–494 (1986).

*Primary Examiner*—Michael Wityshyn
*Attorney, Agent, or Firm*—Marguerite E. Gerstner; Timothy H. P. Richardson; Herbert G. Burkard

[57] ABSTRACT

A sealing strip, particularly for making a telecommunications splice case comprises a sintered ultra high molecular weight polyethylene strip that can weld together parts of, for example, a wrap-around sleeve.

11 Claims, 6 Drawing Sheets

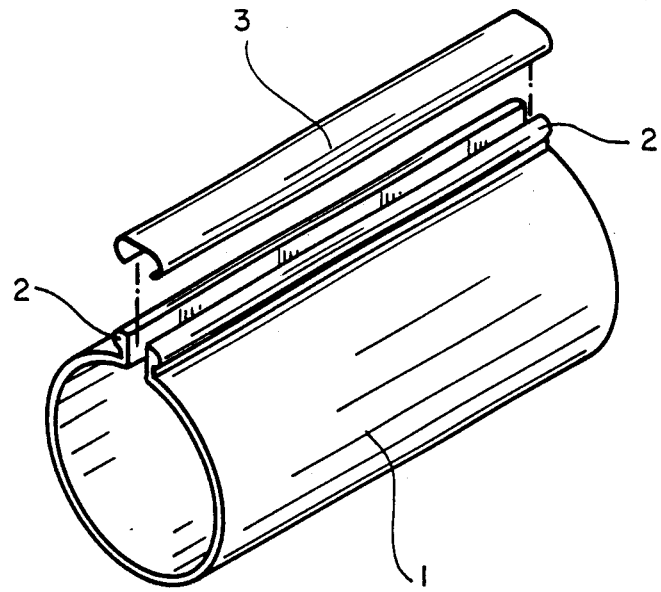
FIG_1
(PRIOR ART)
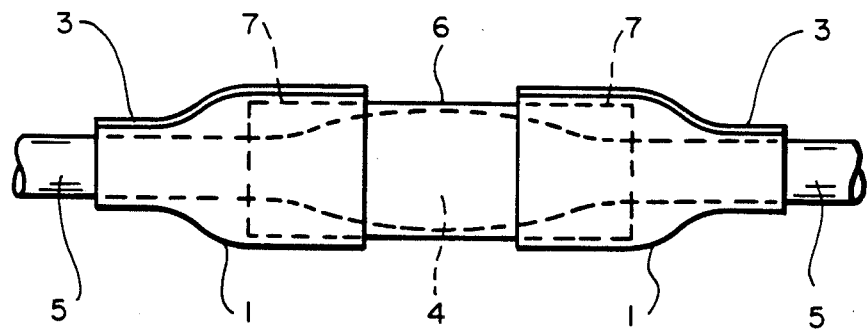
FIG_2
(PRIOR ART)

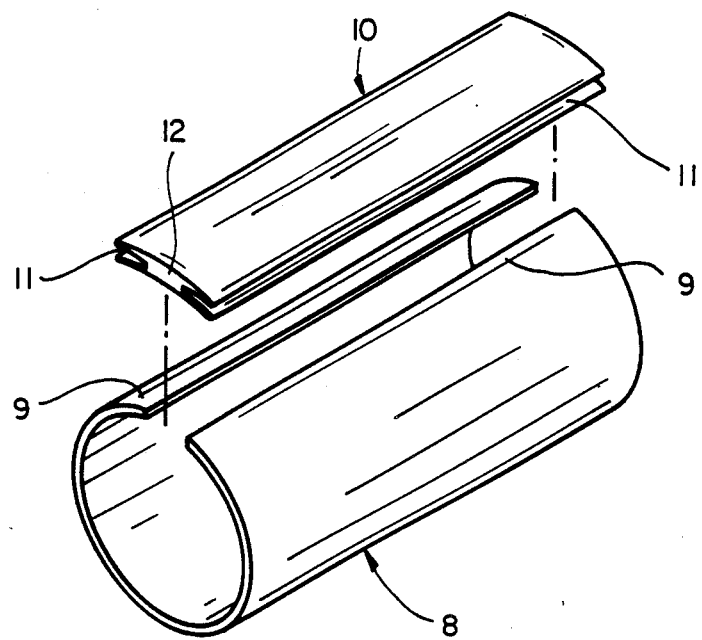
FIG_3
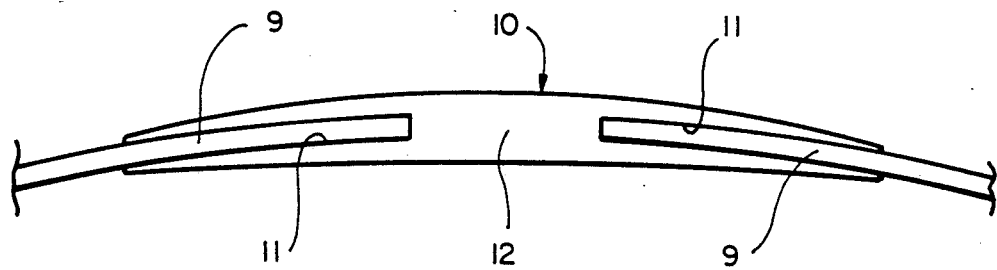
FIG_4

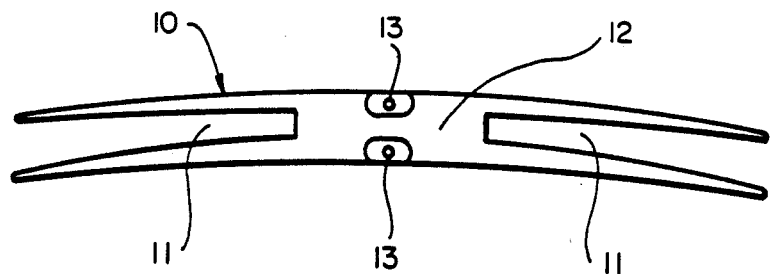
FIG_5
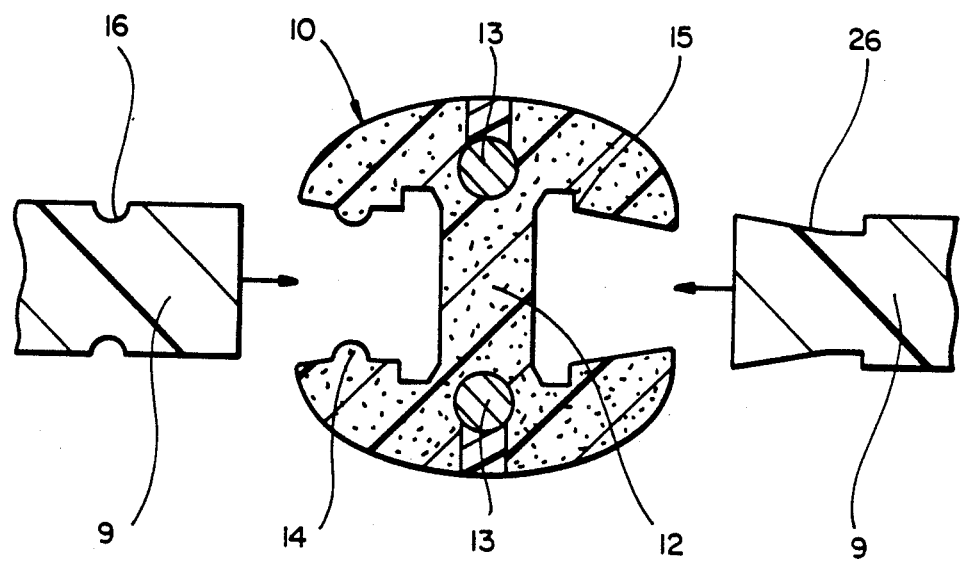
FIG_6

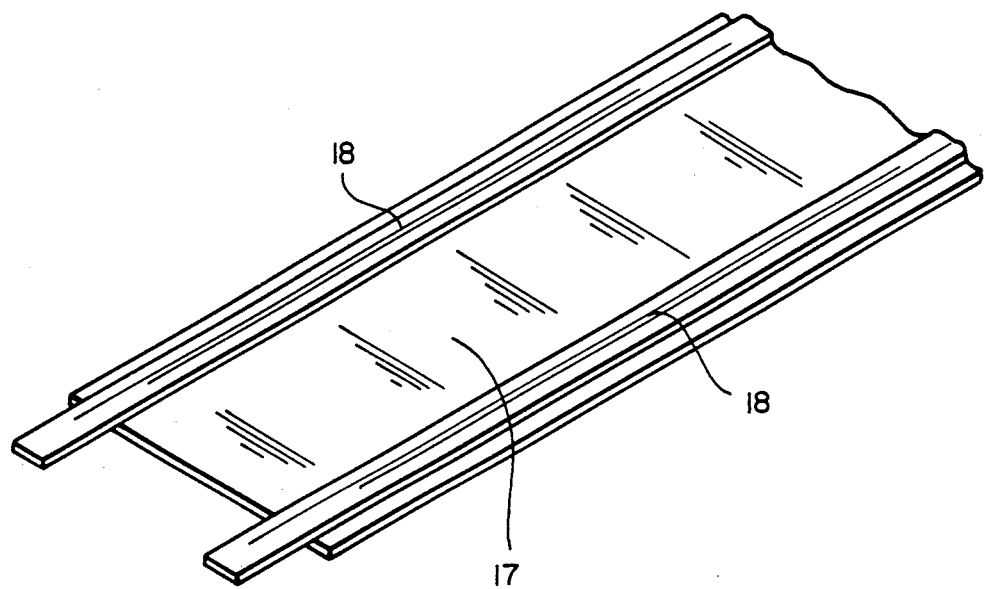
FIG_7
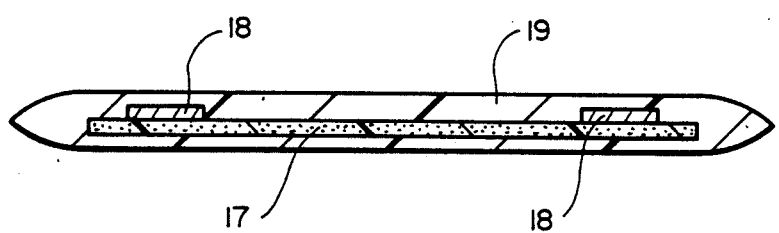
FIG_8

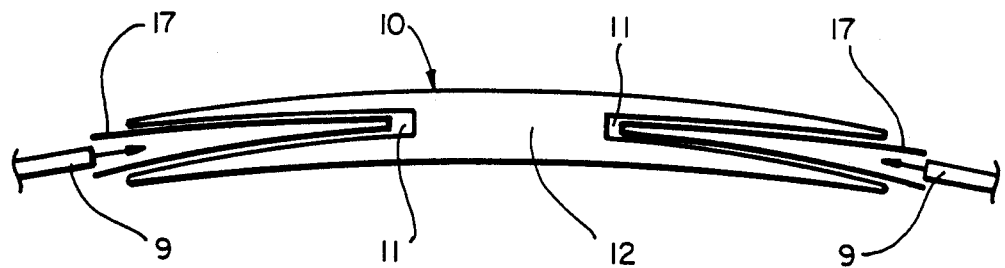
FIG_9
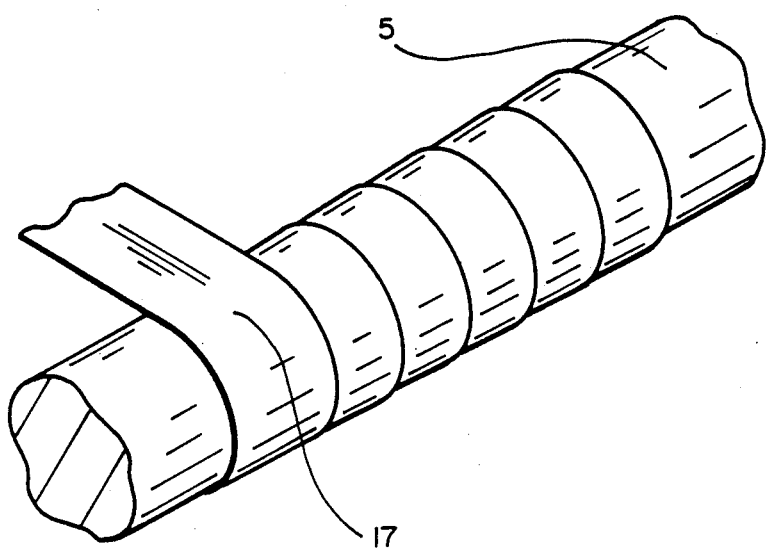
FIG_10

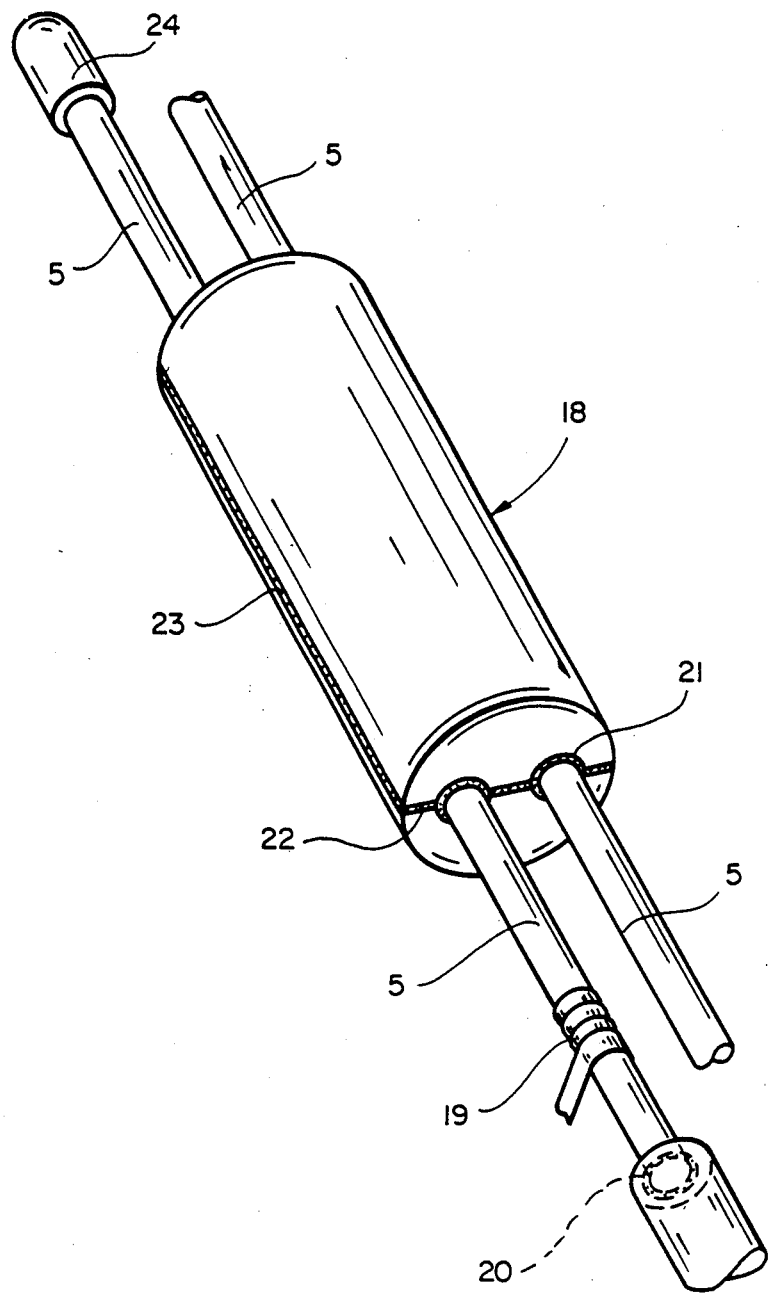
FIG_11

JOINING OF SHEETS

This application is a continuation of application Ser. No. 07/061,354, filed June 11, 1987 now abandoned.

Sheet materials are widely used for environmental protection, including electrical insulation, of substrates such as cables and pipes. A sheet of material may be installed around such a substrate to prevent or reduce access to it of moisture, dirt or air etc. Often a tight engagement or some form of bond is required and that requirement together with a requirement for easy installation gives rise to a problem: namely how to provide initial loose fitting and subsequent air or water tight engagement.

One solution has been to use dimensionally recoverable, particularly heat-shrinkable, articles such as sleeves. They may be loosely installed around a cable or a pipe and then shrunk down, by heating, into tight engagement. Such a sleeve may be tubular, by which is meant that it is supplied for use closed in cross-section; or it may be what is known as "wrap-around". A tubular sleeve has to be slid over an end of a pipe or cable etc., whereas a wrap-around sleeve may be wrapped around a pipe or cable etc., and then secured in its wrapped around configuration before shrinking. Wrap-around sleeves have the advantage of not requiring an accessible end to the substrate to be enclosed. In general, a wrap-around sleeve is any sleeve, such as a sheet of material, capable of being wrapped around a substrate and secured in its wrapped around configuration.

One widely used design of heat-shrinkable wrap-around sleeve is disclosed in GB No. 1,155,470 to Raychem Corporation. That sleeve has upstanding ridges, known as rails, running along opposite edge portions of the sleeve, which can be brought together and a channel, C-shaped in cross-section, slid over the adjacent rails to hold them together. Such sleeves are generally heated using a propane or other gas torch, although hot-air guns are used for smaller sizes. Electrical heating has also been proposed.

The overall product used to provide environmental protection may be more complex than a simple, single wrap-around sleeve. For example a cable splice may be protected in the following way. A rigid tube may be positioned over the splice itself, and a separate heat-shrink sleeve shrunk down at each end of the tube thus forming a seal between each end and the emerging cable. The splice itself will in general be larger in diameter than the cables it joins (particularly in the case of telecommunications cables) and the two shrinkable sleeves will, when installed, taper down from the larger central tube to the smaller cables.

Whilst a satisfactory product has been produced comprising such a central tube and electrically shrinkable wrap-around end sleeves, it has been found difficult to form the desirable seals if the central tube too is wrap-around rather than tubular. The reason for this problem is as follows. If the central tube were wrap-around, a seal has to be made between its longitudinal edges; and although that problem itself has been solved for example in products known by the Raychem trade mark XAGA, the closure that forms the seal may be bulky. The end sleeves would, however, be installed over this bulky closure and leak paths may exist underneath the end sleeves adjacent the underlying closure. It may be possible to remove end portions of that closure, but that could be inconvenient in many cases.

Much effort has been expended in trying to solve this problem, but hitherto without success.

I have now discovered that a sealing strip may be provided between edge portions of a wrap-around sleeve (or between edge portions of separate sheets) that does not protrude significantly above the surface of the sheets (referred to herein as having a low profile). I have also discovered that a sealing strip can weld such edge portions together, that a sealing strip can seal together plain edge portions (i.e. no special shaped closure such as described in GB No. 1,155,470) are required. Furthermore, I have further discovered that a sealing strip may comprise an electrically-heatable material having a significant coefficient of thermal expansion such that surfaces to be sealed may be forced together, and that a sealing strip may comprise a sintered conductive polymer composition, such as ultra high molecular weight polyethylene and carbon black.

Thus, the invention provides a method of forming a tubular structure, which comprises:

(a) providing a wrap-around sleeve having a first longitudinal edge portion and a substantially plain second longitudinal edge portion, said edge portions being capable of being brought substantially together such that the sleeve has a tubular configuration;

(b) engaging said first and second edge portions with an electrically heatable longitudinal sealing strip; and (c) electrically powering the strip to form a bond (which term includes a weld) between the strip and the second edge portion.

The invention also provides a method of forming a tubular structure, which comprises:

(a) providing a substantially rigid wrap-around sleeve having first and second edge portions being capable of being brought substantially together such that the sleeve has a tubular configuration;

(b) positioning between the first and a second edge portions a first portion of an electrically heatable sealing strip, said first portion of the strip expanding when the strip is electrically powered;

(c) positioning around the sleeve means for urging said first and second edge portions against the sealing strip; and (d) electrically powering the sealing strip to expand the first portion of the strip between the edge portions and to bond the strip to the edge portions.

The invention further provides a sealing device (preferably in strip form) suitable for joining together sheet edge portions, said device having means, such as a recess, for receiving said edge portions, and comprising a sintered conductive polymer.

The invention still further comprises a sealing device (preferably in strip form) for joining together sheet edge portions, which comprises:

(a) a first recess within which a first edge portion can be received;

(b) a second recess within which a second edge portion can be received;

(c) a heating portion between said recesses; and (d) first and second electrodes, which on connection to a source of electrical power cause said heating portion to be heated.

Preferably some means, such as a shrinkable sleeve, is used to form a seal between the wrap-around sleeve whose configuration is made tubular by the sealing strip, and the cables or other substrates that emerge from the sleeve.

The sealing strip or other device preferably comprises a conductive polymer particularly a polymeric material together with a conductive filler such as carbon black. Preferred polymeric materials include polyolefins, particularly polyethylene, especially ultra high molecular weight polyethylene (UHMWPE). The material is preferably formed by sintering. The device may, but generally will not, be heat-recoverable. We prefer therefore that it serves merely to locate the two surfaces to be joined, optionally bridging a gap between them, and to activate a heat-activatable adhesive or sealant and/or to form a weld.

The conductive polymer preferably has a resistivity at 23° C. in the range 0.5-100, more preferably 0.5-25, particularly 0.75-8 ohm cm, and can preferably achieve a bond line temperature of at least 150° C., more preferably at least 200° C., especially at least 250° C. The material preferably expands significantly on heating, and preferably retains significant stiffness. The desired temperature is preferably attained under normal ambient conditions in less than 30 minutes, preferably less than 15 minutes using a power source of less than 50 volts preferably 12 or 24 volts.

It may be desirable that rapid heating is achieved and for this reason positive temperature coefficient of resistance (PTC) behavior may not be desirable in spite of the temperature control benefit. Thus, it may be preferred that resistivity changes by a factor of less than 5, preferably less than 2 over the temperature range 23°-250° C.

Preferably the conductive polymer composition used comprises, more preferably consists essentially of, (a) a matrix consisting essentially of organic polymer particles which have been sintered together so that the particles have coalesced without completely losing their identity, and (b) a particular filler, preferably carbon black, which is dispersed in said matrix but which is present substantially only at or near the boundaries of the coalesced particles.

Such conductive polymers can be prepared by sintering a dry blend of polymer particles and the conductive filler. A typical process involves compaction of the dry blend, sintering of the compacted blend at or above atmospheric pressure and at a temperature at which the polymer softens but does not flow excessively, followed by cooling under pressure. The quantity of conductive filler required to provide a given level of resistivity is much less than in a melt-blended product. Thus, the preferred sintered compositions for use in this invention contain less than 9%, preferably less than 7%, particularly 2-6% by volume of carbon black or other conductive filler. Care should be used in selecting the filler to achieve the desired level of resistivity at these loadings. Excellent results have been achieved using Ketjenblack EC, trade mark, from Akzo Chemie.

The polymer used in preferred sintered compositions is preferably one which maintains a relatively high viscosity at the sintering temperature. Accordingly, it is preferred to use a polymer which, at a temperature 50° C. above its softening point, has a melt flow index (MFI) of less than 0.3 g/10 minutes, particularly less than 0.1 g/10 min., especially less than 0.05 g/10 min. a a loading of 5 kg, and a MFI of less than 3.0 g/10 min., particularly less than 1.0 g/10 min., especially less than 0.1 g/10 min. at a loading of 15 kg. Particularly good results have been obtained using UHMPWE, especially such polyethylene having a molecular weight greater than about 1.5 million, particularly greater than about 3 million. Other polymers that may usefully be sintered include polytetrafluoroethylene, polyphenylene sulphides and polyimides.

The polymeric material may, if desired, be cross-linked for example by irradiation, say to a dose of 3-20 mega rads. Where fusion, i.e. a weld, between the sealing device and the sheet edges is desired, the degree of cross-linking should be selected with this in mind. Cross-linking may be desired if the device is to be made heat-recoverable.

The invention is further illustrated by the accompanying drawings, in which:

FIGS. 1 and 2 show prior art techniques for forming cable splice cases;

FIG. 3 shows a wrap-around sleeve having a sealing strip for securing it in the wrapped configuration;

FIG. 4 shows a strip of FIG. 3 when installed;

FIG. 5 shows a sealing strip with electrical heating means;

FIG. 6 shows a sealing strip and sheet edge portions with matching profiles;

FIG. 7 shows a thin and flexible heating strip of substantially rectangular cross-section, together with electrodes, FIG. 8 shows in cross-section a preferred heating strip of the general type shown in FIG. 7; and FIGS. 9-11 show preferred uses of the heating strips of the FIGS. 7-8.

FIG. 1 shows a prior art wrap-around heat-shrinkable sleeve 1, such as that disclosed in GB No. 1,155,470 to Raychem. It comprises a web portion having rails 2 running along opposing longitudinal edge portions. The rails may be held together by a channel 3, that may be slid over them. The sleeve is wrapped around a cable or other substrate, the channel positioned over the rails, and the sleeve heated to cause it to shrink over the cable. In this way a cable splice case may be formed.

A more complex cable splice case is shown in FIG. 2. Here a splice 4 is shown joining two multi-core telecommunications cables 5. A generally rigid central tube 6 is positioned over the splice 4, and heat-recoverable wrap-around sleeves 1 are installed to provide a seal between each end portion 7 of the tube 6 and the cables 5. As mentioned above, it is difficult to form a seal between the sleeves 1 and the tube 6 if the tube 6 is of the wrap-around design and has a protruding closure such as the rail and channel closure of FIG. 1.

FIG. 3 illustrates an embodiment of the invention that is able to solve this and other problems. A wrap-around sleeve 8 having two plain edge portions 9 (compare the rails 2 of FIG. 1) may be formed into a tubular structure by use of a sealing strip 10. The sealing strip 10 has edge recesses 11 into which the edge portions 9 may be received. The sealing strip may be, for example from 1-10, especially 1-5, particularly 2-4 cm wide, and 0.5-3 cm thick, although its precise size will of course depend on the size of the sleeve 8. FIG. 4 shows the edge portions inserted into the recesses 11. They may be inserted by sliding the strip 11 longitudinally with respect to the sleeve, or they may be inserted transversely. The sealing strip may be heated in any suitable way, for example by torch or by hot-air, but electrical heating is preferred. Preferably heating is substantially localized in region 12, and it preferably causes edges of the edge portion 9 to become welded to it. If preferred, an adhesive may be provided that is activated on heating.

Preferably some means is provided for holding the edge portions in the recesses 11 and against the portion 12, preferably under resilient bias. Such means may comprise some wrap such as an elastomeric band, for example a silicone, positioned around the circumference of the sleeve. Preferably the strip is of such a material that it expands significantly on heating. Preferably the portion 12 expands thus improving a weld or bond at that region. The material of the sealing strip and that of the edge portions 9 are preferably mutually compatible, such that some molecular mixing or interpenetration occurs under heating and preferably pressure.

The sealing strip preferably comprises ultra high molecular weight polyethylene together with a conductive filler such as carbon black. The material is preferably sintered.

The presence of conductive filler allows the strip to be heated electrically, by applying a potential difference across a convenient part of it, particularly across the portion 12. One way in which this may be done is shown in FIG. 5. Here electrodes 13 are provided attached to, preferably housed within, the strip.

FIG. 6 shows a sealing strip having a shape in cross-section that corresponds with the shape of the edge portions of the sleeve. Protrusion 14 engages recess 16 in the example at the left-hand side, and protrusion 26 engages recess 15 in the example at the right-hand side. The edge portions may be a snap fit, or longitudinal sliding may be required. Alternatively, they may be sized such that they are a free fit, and engagement and bonding or welding occur due to thermal expansion (or recovery) on heating. The strip may deform on contraction or cooling such that the bond or weld is not put under significant stress. The edge portions of the sleeve, although shaped, are substantially plain compared to the profiles of the prior art as shown in FIG. 1. An advantage over the prior art is retained even with this shaping, namely the low profile nature of the closure. The shaping edge portions of the sleeve do not involve an increase in thickness in the embodiments shown. A further feature is illustrated namely an insulation or sealing plug for example of silicone covering the electrodes 13.

In the embodiments illustrated, the sealing strip may be of low profile, flexible, and require little power. Heating is preferably localized, due to the electrode configuration, and the material of the strip is preferably of low thermal conductivity. Thermal expansion of at least a portion of the strip can ensure that the bond line is put in compression during the heating step.

FIGS. 7-11 illustrate an inventive heating strip that may, but need not be used with the sealing strip described above.

FIG. 7 shows a heating strip comprising a resistive heating material, preferably comprising a conductive polymer, particularly ultra high molecular weight polyethylene together with a conductive filler for example carbon black. The material is preferably a sintered material. The preferred materials given above for the sealing strip apply also to this heating strip. The heating strip preferably has a sealing (welding or bonding) function in addition to heating, although it may heat another material and that other material form a bond or weld. The heating strip preferably expands on heating to aid bonding or welding.

Preferably, on application of electrical power a surface temperature of at least 100° C., preferably at least 150° C., especially at least 180° C. is achieved. Heating time to these temperatures is preferably less than 5 minutes, more preferably less than 3 minutes, especially less than 1.5 minutes. Heat output is preferably 2-30, more preferably 5-20, especially 7-15 watts per square inch. Output may depend on absolute size and these figures may be regarded as typical for a strip in the form of a 0.5 inch wide tape. In general the tape is preferably 0.2 to 2 inches. The tape is preferably sufficiently thin that it may be highly flexible, and preferred thicknesses are less than 0.3, more preferably less than 0.2, especially less than 0.15 inch.

Power may be supplied by electrodes positioned on one or both surfaces as shown in FIG. 7. The electrodes preferably extend along the length of the strip, and preferably comprise a metal strip, or foil, such as copper. The strip may be coated on one or both sides with a material for the purpose of electrical insulation and/or provision of a sealing material, for example polyethylene.

FIG. 8 shows in cross-section a heating strip 17, electrodes 18 and a surrounding covering of polyethylene etc.

One use of the heating strip is shown in FIG. 9. Here it is used for heating and welding inside the recesses of a sealing strip 10. This allows the sealing strip 10 to be made from a wider range of materials than is the case when strip 10 is itself electrically heatable. For example, strip 10 could be made from unfilled UHMWPE. This avoids the need for difficult shaping operations which would be required particularly for non-melt processable materials.

FIG. 10 shows a strip 17 used as a wrapping around a cable or pipe.

FIG. 11 shows various uses for heating strip 17. The figure illustrates a splice case 18 comprising half-shells surrounding cables 5. Cable jacket repair is shown at 19 as a simple wrap of the tape. A seal between a cable (or pipe) and a duct is shown at 20. A seal between a cable and a splice case end plate is shown at 21, and a seal between end plate halves is shown at 22. A longitudinal seal between the half-shells is shown at 23. A seal between a cable and an end cap is shown at 24.

The heating strip may conveniently be made by skiving or pairing a thin layer from a thicker piece of material.

I claim:

1. A method of forming a tubular structure, which method comprises
    (a) providing a wrap-around sleeve having a first longitudinal edge portion and a second longitudinal edge portion, said second edge portion being substantially free of protrusions, said edge portions being capable of being brought substantially together such that the sleeve has a tubular configuration;
    (b) positioning said first and second edge portions adjacent to an electrically heatable longitudinal sealing strip which
        (1) comprises a sintered conductive polymer and
        (2) comprises edge recesses into which are inserted said first and second edge portions; and
    (c) electrically powering the strip to form a bond between the strip and at least the second edge portion.

2. A method according to claim 1 wherein the conductive polymer comprises
   (a) a matrix consisting essentially of organic polymer particles which have been sintered together so that the particles have coalesced without completely losing their identity, and
   (b) a particulate filler which is dispersed in said matrix but which is present substantially only at or near the boundaries of the coalesced particles.

3. A method according to claim 2 wherein the particulate filler comprises carbon black.

4. A method according to claim 2 wherein the organic polymer comprises ultra high molecular weight polyethylene.

5. A method according to claim 1 wherein the wrap-around sleeve is composed of insulating material.

6. A method according to claim 1 wherein a bond is formed between the strip and the first edge portion.

7. A method of forming a tubular structure, which method comprises
   (a) providing a substantially rigid wrap-around sleeve which has first and second edge portions, the edge portions being capable of being brought substantially together such that the sleeve has a tubular configuration;
   (b) positioning between the first and second edge portions a first portion of an electrically heatable sealing strip which comprises a sintered conductive polymer, wherein
      (1) said first portion of the strip (i) comprises edge recesses and (ii) expands when the strip is electrically powered, and
      (2) at least one of the first and second edge portions is received within the edge recesses of the sealing strip;
   (c) positioning around the sleeve means for urging said first and second edge portions against the sealing strip; and
   (d) electrically powering the sealing strip to cause the first portion of the strip to expand between the edge portions and to bond the strip to the edge portions.

8. A method according to claim 7 wherein the conductive polymer comprises
   (a) a matrix consisting essentially of organic polymer particles which have been sintered together so that the particles have coalesced without completely losing their identity, and
   (b) a particulate filler which is dispersed in said matrix but which is present substantially only at or near the boundaries of the coalesced particles.

9. A method according to claim 8 wherein the particulate filler comprises carbon black.

10. A method according to claim 9 wherein the organic polymer comprises ultra high molecular weight polyethylene.

11. A method according to claim 7 wherein the wrap-around sleeve is composed of insulating material.

* * * * *